US009809495B2

(12) United States Patent
Brunnmair (10) Patent No.: US 9,809,495 B2
(45) Date of Patent: Nov. 7, 2017

(54) METHOD FOR THE CLOSED-CELL EXPANSION OF MINERAL MATERIAL

(71) Applicant: Binder + Co AG, Gleisdorf (AT)

(72) Inventor: Ernst Erwin Brunnmair, A-Graz (AT)

(73) Assignee: BINDER + CO AG, Gleisdorf (AT)

( * ) Notice: Subject to any disclaimer, the term of this patent is extended or adjusted under 35 U.S.C. 154(b) by 655 days.

(21) Appl. No.: 14/349,984

(22) PCT Filed: Oct. 4, 2012

(86) PCT No.: PCT/EP2012/069653
§ 371 (c)(1),
(2) Date: Apr. 4, 2014

(87) PCT Pub. No.: WO2013/053635
PCT Pub. Date: Apr. 18, 2013

(65) Prior Publication Data
US 2014/0291582 A1    Oct. 2, 2014

(30) Foreign Application Priority Data

Oct. 10, 2011    (AT) .................................. 555/2011 U (51) Int. Cl.
F27B 1/22    (2006.01)
C04B 20/06    (2006.01)
(Continued)

(52) U.S. Cl.
CPC .......... *C04B 20/066* (2013.01); *C04B 20/068* (2013.01); *C04B 38/009* (2013.01);
(Continued)

(58) Field of Classification Search
CPC .. C04B 20/066; F27B 1/00; F27B 1/26; F27B 1/28
(Continued)

(56) References Cited

U.S. PATENT DOCUMENTS 2,636,723 A * 4/1953 Harter ...................... C03B 5/06
                                                    432/106
3,409,450 A    11/1968 Weber et al.
(Continued)

FOREIGN PATENT DOCUMENTS

DE         1 471 380        1/1969
DE      197 22 906 A1    12/1998
(Continued)

OTHER PUBLICATIONS

International Search Report dated Feb. 4, 2013 in PCT/EP2012/069653 (English Translation only).
(Continued)

*Primary Examiner* — Steven B McAllister
*Assistant Examiner* — Ko-Wei Lin
(74) *Attorney, Agent, or Firm* — Oblon, McClelland, Maier & Neustadt, L.L.P.

(57) ABSTRACT

The invention relates to a method for producing an expanded granulate from sand grain-shaped mineral material (1) with a propellant, wherein the material (1) is fed into a vertically upright furnace (2) from above and said material (1) falls along a drop section (4) through multiple heating zones (5) in a furnace shaft (3) of the furnace (2), wherein each heating zone (5) is heatable using at least one independently controllable heating element (6), and the material (1) is heated to a critical temperature at which the surfaces (7) of the sand grains (15) plasticize and the sand grains (15) are expanded by the propellant. In order to enable setting a closed surface of the expanded granulate in a purposeful fashion, it is provided in accordance with the invention that upon detection of a first reduction in the temperature of the material (1) between two successive positions (9) along the drop section (4) the heating elements (6) are controlled along the remaining drop section (4) depending on the critical temperature.

33 Claims, 3 Drawing Sheets

(51) Int. Cl.
  *C04B 38/00*  (2006.01)
  *F27B 1/00*   (2006.01)
  *F27B 1/14*   (2006.01)
  *F27B 1/24*   (2006.01)
  *F27B 1/26*   (2006.01)

(52) U.S. Cl.
  CPC .................. *F27B 1/00* (2013.01); *F27B 1/14* (2013.01); *F27B 1/22* (2013.01); *F27B 1/24* (2013.01); *F27B 1/26* (2013.01)

(58) Field of Classification Search
  USPC ..................................... 432/95, 99, 96, 102
  See application file for complete search history.

(56) References Cited

U.S. PATENT DOCUMENTS

| | | | | |
|---|---|---|---|---|
| 3,627,285 | A | | 12/1971 | Siemssen |
| 3,673,290 | A | * | 6/1972 | Brubaker .............. C04B 38/064 264/125 |
| 4,616,572 | A | * | 10/1986 | Berthiller ................. F23G 5/16 110/196 |
| 4,626,200 | A | * | 12/1986 | Cohen ...................... F27B 1/04 432/101 |
| 5,118,288 | A | * | 6/1992 | Litka ........................ C04B 7/45 432/101 |
| 5,161,967 | A | * | 11/1992 | Rietzscher ................ F27B 1/16 110/263 |
| 5,685,709 | A | * | 11/1997 | Cohen ...................... C04B 2/10 432/103 |
| 2002/0045146 | A1 | * | 4/2002 | Wang ..................... C23C 16/46 432/49 |
| 2009/0127729 | A1 | * | 5/2009 | Hagiwara ............... C01B 33/12 264/5 |

FOREIGN PATENT DOCUMENTS

| | | |
|---|---|---|
| DE | 198 56 736 A1 | 6/2000 |
| DE | 10 2007 025 099 A1 | 11/2008 |
| WO | WO 2008/010074 A2 | 1/2008 |
| WO | WO 2009/009817 A1 | 1/2009 |
| WO | WO 2009009817 A1 * | 1/2009 ............. F27B 1/005 |

OTHER PUBLICATIONS

Katharina Zähringer et al., "Development of a Simulation Model for the Expansion of Perlite", Glass Science and Technology, vol. 74, XP-009165214, Jan. 1, 2001, pp. 57-64.

* cited by examiner

METHOD FOR THE CLOSED-CELL EXPANSION OF MINERAL MATERIAL

The present invention relates to a method for producing an expanded granulate from sand grain-shaped mineral material with a propellant, e.g. from pearlite or obsidian sand, wherein the material is fed into a vertically upright furnace from above, preferably via a chute, and said material falls along a drop section through multiple heating zones separated vertically from each other in a furnace shaft of the furnace, wherein each heating zone can be heated using at least one independently controllable heating element, and the material is heated to a critical temperature at which the surfaces of the sand grains plasticize and the sand grains are expanded by the propellant, and the expanded material is discharged at the bottom end of the furnace.

The present invention further relates to an apparatus for producing an expanded granulate, comprising a vertically upright furnace plus furnace shaft with a feed opening at the upper end of the furnace shaft for feeding a sand grain-shaped material and a discharge opening at the bottom end of the furnace shaft, and a drop section situated between the feed and discharge opening in the furnace shaft, which drop section leads through several heating zones which are vertically separated from each other, wherein the heating zones each comprise at least one heating element which are controllable independently from each other in order to heat the material to a critical temperature, and comprising several temperature sensors for the direct or indirect measurement of the temperature of the material and/or means for determining the power of the heating elements of the heating zones.

DESCRIPTION OF THE PRIOR ART

Light-density materials are in great demand as starting materials for various applications in the construction industry such as the ready-mix mortar industry or in insulating technology. The light-density materials are principally divided into oil-based materials and mineral materials. Although oil-based materials come with the disadvantage of flammability, their production processes are well researched however, thus allowing cost-effective production. Polystyrene is a prime example for an oil-based insulating material which is preferably used in the construction industry for thermal insulation. The serious disadvantage of easy flammability is accepted due to the low price, partly with catastrophic consequences if a fire occurs.

In contrast to this, insulating materials made of mineral materials, which mainly concern (crystal) water-containing rock (e.g. the volcanic rock such as pearlite, obsidian and the like) in granulate form, are non-flammable. However, the production processes are not researched as well as those for oil-based insulating materials. Concerning the achievable qualities and the possible production costs, the production processes of mineral insulating materials still seem to have a large amount of development potential.

Pearlite furnaces have long been known from the state of the art, in which hot combustion air is blown from below to the top through a vertically arranged pipe. The (pearlite) sand to be expanded is supplied downwardly via a chute from above, i.e. in any case to a region of the furnace which is arranged above the bottom end of the furnace. The sand is heated in the hot exhaust gas in counter-current up to a critical temperature at which the sound is plasticized and the water bound in the sand evaporates. The evaporation process is accompanied by the expansion of the sand up to 20 times its original volume.

The individual sand grains are ripped open by the expansion process, so that an open-pored, very light and strongly hygroscopic granulate is obtained. This granulate is discharged upwardly with the exhaust gas flow and separated in a filter. The granulate is mainly used in insulation technology for the thermal insulation of tanks for liquid natural gas (LNG), but also as an additive to ready-mixed mortars for improving the processing ability and as an insulating bottoming for constructing floors in apartment houses.

The main disadvantage of the pearlite expanded in this manner is its open pores, leading to strongly hygroscopic properties and limited dimensional stability. In order to counteract its hygroscopic properties, a subsequent impregnation with silicone is known from the state of the art, but this requires an expensive additional process step which comes with the disadvantage of the flammability of silicone from approximately 200° C.

Previous attempts to produce closed-cell expanded pearlite have been unsatisfactory. On the one hand, the precise causes of the closed-cell expansion have not been researched. On the other hand, there is no possibility up until now to control the process of the closed-cell expansion and to influence said process in a purposeful way. The latter also means that the precise surface structure of the expanded grains cannot be set intentionally during the production process. This prevents setting the roughness for example, which again plays an important role in processing with other materials.

It was further noticed that in the case of excessive water content the already expanded grain will break up before its surface has solidified again by the cooling process during expansion. In this respect it is known from the state of the art that the water content, i.e. the fraction of the water bound in the material, can be reduced by thermal conditioning of the raw sand to the value which is optimal for the expansion.

A renewed heating of the sand grain after the actual expansion process can produce a continuation of the expansion, but this leads to the likelihood that the already expanded grain will break up or show low strength values after the renewed expansion process.

Patent literature only deals with individual aspects of the expansion process or the apparatuses used for this purpose. The underlying mechanism or controlled prevention of the open-pored configuration of the expanded granulate are not discussed. Consequently, EP 0225074 B1 shows a method for the heat treatment of expandable material, consisting of two heating stages with preheating and heating and subsequent active cooling by blowing coolant onto the expanded material. AT 504051 B1 proposes additional screening between the two heating stages. WO 2009/009817 A1 shows a shaft furnace in which expansion occurs. The material to be expanded is supplied from above to the furnace and removed at the bottom end of the shaft furnace, which is why WO 2009/009817 A1 is regarded as the closest state of the art.

OBJECT OF THE INVENTION

It is therefore the object of the present invention to provide a method for the expansion of sand-like mineral materials by a propellant, in which a closed surface of the expanded granulate can be set in a controlled manner, so that the expanded granulate does not show any hygroscopicity, or hardly any thereof. Furthermore, the possibility shall be provided to influence the surface structure of the expanded granulate and therefore its roughness in a purposeful fashion. It is also the object to provide an apparatus for performing the method in accordance with the invention.

SUMMARY OF THE INVENTION

The basis of the invention is the discovery obtained from a large number of tests that the actual expansion process, the basis of which is the softening of sand grain in conjunction with the formation of water vapor or another propellant, is an isenthalpic process, which means that enthalpy remains constant during the actual expansion process with the enlargement of the sand grain volume, wherein principally each sand grain represents a thermodynamic system, but in practice obviously many sand grains combined form a system.

The isenthalpic expansion process is linked to an abrupt reduction or decrease in the material temperature, which can also be classified as a temperature drop and which makes the grain harder again and freezes the expansion process. The isenthalpic expansion process can be accompanied by a temperature drop of over 100° C. for example, i.e. the temperature of the material decreases significantly during the expansion process and plasticity decreases.

This knowledge allows detecting the expansion process in a manner that is virtually independent from the used starting material, i.e. it can be determined when and at which point in the furnace the expansion occurs. This allows on the other hand successfully preventing the breaking open of the grain that has only just been expanded in that the heat supply after the expansion process is considerably reduced or entirely prevented in a purposeful fashion. This means the temperature drop represents the first reduction in the material temperature, which is detected at two successive positions along the path of the material through the furnace.

The detection of the temperature drop occurs either via direct temperature measurement of the sand in the furnace or indirectly via the detour of a measurement of the cooling water temperature in a subsequent process or via determination of a change in the heat flow.

The expansion process itself occurs in a shaft-like, vertically upright furnace, in which the starting material is supplied from above by means of a chute. The interior of the furnace, i.e. the furnace shaft, forms a drop section for the material, wherein several heating zones are arranged vertically separated from each other along the drop section, which heating zones comprise heating elements which can be controlled and regulated independently from each other. The material is thus heated to a critical temperature, in which the surface of the sand grains becomes plasticized. Water vapor is formed as a result of the water bound in the material, the pressure of which now expands sand grain in an isenthalpic manner. The concomitant cooling of sand grain is detected. This obviously also applies if another propellant is present in the material instead of water. The position of the expansion process in the furnace shaft will generally not be the same for all sand grains since the sand grains are virtually never the same size and the same weight. The expansion process will accordingly occur in a region of the drop section. This region lies between the two points between which the first reduction in the material temperature was determined.

The temperature of the material will not be increased again from the position or from the region where or in which a temperature drop was determined, but said temperature is reduced in a purposeful manner along the remaining drop section. The latter occurs in that the power of the heating elements in the heating zones along the remaining drop section is down-regulated as a function of the remaining drop section. This may concern a step function, which can be realized by zero power of the heating elements in the heating zones along the remaining drop section, or a decrease in the heating power in several steps. The discharge of the material occurs by way of a water-cooled chute, wherein the water cooling contributes to further cooling of the material, thus further reducing its plastic deformability.

That is why it is provided in a method for producing an expanded granulate from sand grain-shaped mineral material with a propellant, e.g. from pearlite or obsidian sand, wherein the material is fed into a vertically upright furnace from above, preferably via a chute, and said material falls along a drop section through multiple heating zones separated vertically from each other in a furnace shaft of the furnace, wherein each heating zone is heatable using at least one independently controllable heating element, and the material is heated to a critical temperature at which the surfaces of the sand grains plasticize and the sand grains are expanded by the propellant, and the expanded material is discharged at the bottom end of the furnace, that upon detection of a first reduction in the temperature of the material between two successive positions along the drop section the heating elements are controlled along the remaining drop section depending on the critical temperature.

The best quality of the expanded grains concerning their mechanical properties or strength and entirely missing or lowest possible hygroscopic properties is accompanied by a respectively solid and non-broken surface of the expanded grains. It can be realized in a preferred embodiment of the method in accordance with the invention in that the heating elements are controlled along the remaining drop section in such a way that the material temperature along the remaining drop section does not increase to or over the critical temperature, thus preventing renewed expansion.

Since the sand grains to be expanded do not all have identical dimensions or masses in practice, not all sand grains simultaneously reach the critical temperature in practice. Accordingly, the expansion process does not occur at one point but in a region of the furnace shaft. After the region in which a sufficiently large fraction of sand grains is expanded so that a temperature drop is detected, the power of the heating elements is down-regulated according to the aforementioned preferred embodiment of the method in accordance with the invention, so that a renewed expansion is prevented. Not all sand grains are expanded in this region, since sand grains have not yet reached the critical temperature from a specific size and mass at the end of the region. In the aforementioned preferred embodiment of the method in accordance with the invention, these sand grains cannot be expanded as a result of the described control of the heating elements even after the region and are therefore discharged in a non-expanded form from the furnace shaft or the furnace. This means that the material discharge from the furnace contains a specific fraction of non-expanded sand grains in this case. It may be economically useful to minimize this fraction of non-expanded sand grains or to maximize the fraction of expanded sand grains and to thus accept deterioration in the material properties, especially higher hygroscopy and lower strength. In this case, the fraction of expanded sand grains can be increased in that the material is reheated or further heated again after the detection of the temperature drop along the remaining drop section, especially to or over the critical temperature necessary for the expansion process. The heavier or larger sand grains can therefore also reach the critical temperature and expand along the remaining drop section, so that the total fraction of expanded sand grains will increase. That is why it is provided in a further preferred embodiment of the method in accordance with the invention that the heating elements are controlled along the remaining drop section in such a way that the material temperature increases to or over the critical temperature along the remaining drop section. The renewed increase in the temperature along the remaining drop section leads to a deterioration in the material quality for the already expanded grains, because renewed expansion may occur in which the strength decreases or the surface of the already expanded sand grains can break open. The latter has an especially negative effect concerning the concomitant hygroscopy.

With respect to the used material it is not only possible to use mineral sands in which water is bound as the propellant such as pearlite or obsidian sand. It can also concern mineral dust which is mixed with a water-containing mineral binding agent, wherein in this case the water-containing mineral binding agent acts as a propellant. The expansion process can occur in this case as follows:

The mineral dust, which consists of relatively small sand grains of 20 µm for example, forms larger grains of 500 µm for example with the binding agent. The surfaces of the sand grains of the mineral dust become plasticized at a critical temperature and form closed surfaces of the larger grains or fuse into such grains. Since the closed surface of an individual larger grain is usually smaller in total than the sum total of all surfaces of the individual sand grains of the mineral dust which are involved in the formation of said larger grain, surface energy is obtained in this manner and the ratio of surface to volume decreases.

From this moment, larger grains are present with a respectively closed surface, wherein the grains have a matrix consisting of mineral sand dust and water-containing mineral binding agent. Since the surfaces of these larger grains are still plastic, the forming water vapor can thus subsequently expand the larger grains, i.e. the water-containing mineral bonding agent is used as a propellant.

The mineral dust can also be mixed alternatively with a propellant, wherein the propellant is mixed with a mineral binding agent which preferably contains water. $CaCO_3$ can be used as a propellant for example. The expansion process can occur in this case similar to the one described above: the mineral dust, which has a relatively small sand grain size (with a diameter of 20 µm for example), forms larger grains with the propellant and the mineral bonding agent (with a diameter of 500 µm for example). When reaching a critical temperature, the surfaces of the sand grains of the mineral dust are plasticized and form a closed surface of the larger grains or fuse into such grains. The closed surfaces of the larger grains are still plastic and can now be expanded by the propellant. If the mineral binding agent contains water, it can act as an additional propellant. That is why it is provided in a preferred embodiment of the method in accordance with the invention that the mineral material with the propellant concerns a mineral material in which water is bound and acts as a propellant, or a mineral dust mixed with a water-containing mineral binding agent which acts as a propellant, or a mineral dust mixed with a propellant which is mixed with mineral binding agent, wherein the mineral binding agent preferably contains water and acts as an additional propellant.

In order to enable the method to be performed, an intelligent open-loop and closed-loop control unit is necessary in addition to a shaft furnace with several heating zones with controllable heating elements. It evaluates data from temperature sensors for example in order to determine or detect the temperature drop of the material and the respective position or region in the furnace shaft. On the basis of this detection, the open-loop and closed-loop control unit controls the heating elements of the heating zones, especially along the remaining drop section. It is understood that the heating elements of the heating zones along the drop section are also controlled before the expanding position or the expanding region and therefore can be set to a large variety of temperature profiles up until expansion. As a result, an apparatus in accordance with the invention for producing an expanded granulate, comprising a vertically upright furnace plus furnace shaft with a feed opening at the upper end of the furnace shaft for feeding a sand grain-shaped material and a discharge opening at the bottom end of the furnace shaft, and a drop section situated between the feed and discharge opening in the furnace shaft, which drop section leads through several vertical heating zones, which are vertically separated from each other, wherein the heating zones each comprise at least one heating element which are controllable independently from each other in order to heat the material to a critical temperature, and comprising several temperature sensors for the direct or indirect measurement of the material temperature and/or means for determining the power of the heating elements of the heating zones, is characterized in that an open-loop and closed-loop control unit is provided which is connected to the temperature sensor and/or the means for determining the power of the heating elements of the heating zones and to the heating elements of the heating zones in order to detect a first decrease in the temperature of the material, preferably of at least 100° C., between two successive positions along the drop section, and that the heating elements are controllable depending on the critical temperature by the open-loop and closed-loop control unit, especially in order to prevent or to enable in a purposeful fashion an increase in the material temperature along the remaining drop section to the critical temperature or over the critical temperature. In the case of electrical heating elements for example, the means for determining the power or the power consumption of the heating elements can concern current/voltage or power measuring instruments.

The input of energy used for the expansion can be minimized in a purposeful fashion by the detection of the temperature drop. Similarly, the product quality of a closed-cell solid granulate can be ensured approximately independently of the starting material. As compared to the state of the art, even small and minute sand grain fractions can be expanded in a closed-cell way. Since fine expanded granulates have higher strength values than comparatively large granulates, interesting new light-density materials can be realized for the manufacturing industry.

For the detection of the temperature drop, the temperature of the material can be measured at several points along the drop section. The measurement of the temperature can occur directly or indirectly. A direct measurement would be provided by temperature sensors which are arranged in the interior of the furnace. The temperature sensors may or may not come into contact with the material. In the latter case, only the temperature in the heating zones is determined. It is important that the temperature sensors are arranged in a distributed fashion on vertically spaced positions over the drop section in order to enable the localization of the local occurrence of the temperature drop. It is accordingly provided in a preferred embodiment of the method in accordance with the invention that the temperature of the material in the furnace shaft is measured directly or indirectly at several positions which are vertically spaced from each other in order to detect a first reduction in the temperature of the material, preferably of at least 100° C., between two successive positions along the drop section.

Especially in this case, it is advantageous for the determination of the position or local region of the temperature drop along the drop section if at least one temperature sensor is arranged in each heating zone, which temperature sensor measures the temperature prevailing there. Accordingly, it is provided in a preferred embodiment of the apparatus in accordance with the invention that at least one temperature sensor is arranged in each heating zone. This obviously implies that temperature sensors are provided which are vertically spaced from each other. In the case of a direct temperature measurement, the temperature sensors can be arranged in the furnace shaft or along the drop section and even come into contact with the material.

The detection of the temperature drop can also occur by way of determining the change in heat flow from one heating zone to another. The heat flow from the heating elements to the material is meant in this case. It depends on the temperature difference between the heating elements and the material. The temperature difference between the heating elements and the material successively decreases during the heating of the material. The heat flow decreases accordingly, i.e. the determined change in the heat flow from one heating zone to the next is a decrease at first. Directly after the expansion process and the resulting temperature drop, the temperature difference between the material and the heating elements is substantially greater than directly before the expansion process. The heat flow will also accordingly increase, i.e. the determined change in the heat flow from one heating zone to the next is now an increase. This detected increase in the heat flow is therefore suitable in order to determine the temperature drop and its region in the furnace shaft. It is accordingly provided in a preferred embodiment of the method in accordance with the invention that the change in the heat flow from the heating elements to the material is determined, wherein the change between one heating zone and a next one, preferably the next following heating zone, is determined, and the detection of the first decrease in the temperature of the material between two successive positions along the drop section occurs by detecting an increase in the heat flow from one heating zone to the next, preferably the next following heating zone. The determination of the change in the heat flow or the detection of the increase in the heat flow occurs specifically by way of the measurement of the power consumed by the heating elements at a predetermined target temperature to be reached. After the temperature drop, the difference between the target temperature and the material temperature is greater than directly before the expansion process, which is why the heating elements in the heating zone in which the temperature drop occurs and/or which follows the region of the temperature drop consume more power in comparison with the heating elements of the preceding heating zone. This increase in power corresponds to the increase in the heat flow.

A closed-cell granulate can be produced in the described way, which does not comprise or hardly comprises any hygroscopy and is not combustible. The granulate grains can be produced with different surface structures. The specific surface structure of the granulate grains can be adjusted between a simple spherical shape and a shape of several mutually connected entities, similar to several mutually connected soap bubbles or similar to the shape of a blackberry.

The surface structure which has a direct effect on the roughness of the granulate and therefore on its processing capability with other materials can be influenced among other things by thermal treatment after the expansion process. For this purpose, the heating power of the heating elements in the heating zones is successively reduced or suddenly set to zero in the drop section remaining after the expansion process. As a result, the expanded grains, which are still provided with a certain amount of plasticity, are given the opportunity to a higher or lower extent to connect to each other in the furnace shaft. Tests with pearlite have produced a preferred surface structure consisting of five to seven mutually connected entities in the case of an immediate termination of any further heat supply. That is why it is provided in a preferred variant of the method in accordance with the invention that the power of the heating elements is set to zero along the entire remaining drop section.

As a result of the high process temperature, lifting forces are present in the furnace shaft which acts like a chimney, which lifting forces have an effect in particular on smaller sand grain particles. Accordingly, the lifting forces produce a longer dwell time in the furnace shaft in the case of smaller and therefore lighter sand grain particles than larger and heavier sand grains. This means that the smaller, lighter sand grains in the furnace shaft can overheat, which has an adverse effect on the mechanical properties of these expanded sand grains, for example. In order to prevent the prolonged dwelling of smaller, lighter sand grains over larger, heavier sand grains in the furnace shaft, the furnace shaft is operated with slight negative pressure. This ensures that process air is sucked through the furnace shaft with the material from the top to the bottom and the dwell time of larger, heavier sand grains and smaller, lighter sand grains is adjusted to each other. That is why it is provided in a preferred embodiment of the method in accordance with the invention that the material is sucked together with a first process air through the furnace shaft, preferably by applying a negative pressure to the furnace shaft.

The first process air flowing through the furnace shaft from top to bottom is subject to heating. This leads to an increase in the flow velocity in the furnace shaft, thus leading to a reduction in the dwell time of all sand particles in the furnace shaft. This is not desirable. In order to compensate the increase in the flow velocity of the first process air, the furnace shaft is provided downwardly with a wider configuration than at the top. The flow velocity in the furnace shaft can be kept approximately constant in this way. That is why it is provided in an especially preferred embodiment of the method in accordance with the invention that the first process air flows at a substantially constant velocity through the furnace shaft.

It is therefore accordingly provided in a preferred embodiment of the apparatus in accordance with the invention that the cross-section of the furnace shaft increases normally to the drop section from the feed opening to the discharge opening. The increase in the widths of the furnace shaft can occur in steps or continuously. A conical arrangement is advantageous in the latter case due to the relatively simple production of such a furnace shaft. That is why it is provided in an especially preferred embodiment of the apparatus in accordance with the invention that the cross-section of the furnace shaft has a conical shape parallel to the drop section.

In conjunction with applying a negative pressure to the furnace shaft, a substantially constant velocity of the first process air flowing through the furnace shaft can be ensured. That is why it is provided in an especially preferred embodiment of the apparatus in accordance with the invention that means are provided for producing a negative pressure in the furnace shaft along the drop section in a falling direction which is parallel to the drop section and faces from the feed opening to the discharge opening in order to suck a first process air at substantially constant velocity through the furnace shaft. Such a means would be a respectively dimensioned vacuum pump for example. It could simultaneously be used for the operation of the entrained-flow conveyance for removing the expanded granulate after its discharge from the furnace. Producing the negative pressure in the drop direction means that the negative pressure increases in the falling direction.

The velocity with which the sand grains fall through the furnace shaft increases at first according to the law on the velocity of falling bodies. Due to the small size of the unexpanded sand grains and their relatively high density, braking due to air resistance only plays a minor role. The unexpanded sand grains therefore not only reach a velocity which is higher than the flow speed of the first process air, but are further accelerated according to the law on the velocity of falling bodies. The volume of the sand grains increases suddenly as a result of the expansion and their density decreases. The air resistance therefore also increases suddenly and the expanded sand grains are braked strongly by the first process air. Subsequently, the sand grains fall at a substantially constant velocity through the furnace shaft, the constancy of which is determined by the constancy of the flow velocity of the first process air. The absolute value of this falling velocity depends on the diameter or volume and the density of the expanded sand grains and will generally be greater than the flow velocity of the first process air, i.e. the falling velocity of the expanded grains is obtained from the interaction between the law on the velocity of falling bodies and the resistance of the first process air which flows at a substantially constant velocity through the furnace shaft, wherein the air resistance plays the dominant role. That is why it is provided in an especially preferred embodiment of the method in accordance with the invention that the expanded material falls at a substantially constant velocity through the furnace shaft, wherein the falling velocity of the expanded sand grains depends on their diameter. Accordingly, a maximum dwell time of the sand grains in the furnace shaft is obtained depending on the diameter (and the density) of the sand grains, which maximum dwell time is not exceeded.

In order to prevent substantial emissions, the heat supply in the furnace shaft occurs by heat radiation. According to the state of the art, heat-resistant steels are used as shaft materials in the heating by means of heat radiation, which steels represent high heat storage masses however. As a result, such arrangements require long start-up and shut-down periods. In order to prevent this, the furnace shaft is made of heat-resistant fabric or highly heat-resistant glass, or is lined with such materials. It is accordingly provided in a preferred embodiment of the apparatus in accordance with the invention that the furnace shaft has an inner surface which is lined with heat-resistant fabric or glass segments.

The heating elements are arranged behind the lining of the inner surface of the furnace shaft and a thermal insulation behind the heating elements, as seen from the radial center of the furnace shaft with direction of view to the outside.

Irrespective of the aforementioned measures for evening out the flow velocity of the first process air and therefore the dwell time of the material in the furnace shaft, it is a fundamental fact that small, light sand particles reach the expansion temperature faster than large, heavy ones. There is a likelihood of overheating especially for these smaller sand particles. If a collision occurs with the furnace shaft, this leads to adhesion by caking to the same. In order to counteract such collisions and potential adhesion by caking, the heat-resistant fabric is arranged in an air-permeable way, so that second process air can be injected into the furnace shaft in the direction of the radial center of the furnace shaft from the space between the heat insulation and the furnace shaft in which the heat elements are also installed. The air quantity is set by a respective throttling member, preferably a controllable valve. In the case of an arrangement of the furnace shaft with heat-resistant glass, a similar effect is achieved by subdividing the glass into segments, wherein a gap can be situated between the glass segments from which the second process air can be injected from the aforementioned intermediate space into the furnace shaft. That is why it is provided in an especially preferred embodiment of the method in accordance with the invention that a quantity of second process air which is regulated by means of at least one throttling member is blown from an inner surface of the furnace shaft in the direction towards the radial center of the furnace shaft in order to prevent adhesion by caking of the material on to the inner surface of the furnace shaft.

It is similarly provided in a preferred embodiment of the apparatus in accordance with the invention that the heat-resistant fabric is air-permeable and a second process air can be injected in the direction towards the radial center of the furnace shaft through the air-permeable, heat-resistant fabric. It is accordingly provided in an alternative embodiment of the apparatus in accordance with the invention that gaps are arranged between glass segments and a second process air can be injected through the gaps in the direction towards the radial center of the furnace shaft in order to prevent adhesion by caking of the material on to the inner surface of the furnace shaft. Furthermore, at least one throttling member is provided in an especially preferred embodiment of the apparatus in accordance with the invention, by means of which the quantity of second process air to be injected is adjustable. The throttling member preferably concerns a controllable valve.

As already mentioned, the adjustment of a matching fraction of bound water or any other propellant is necessary in order to guarantee expansion on the one hand and to prevent a breakup of the grains during expansion on the other hand. The humidity content of the raw sand and its weight decrease during drying can be determined at first in the laboratory. It is used as a default value for raw sand conditioning during the production process, i.e. it is known as a result of the laboratory tests how long the raw sand needs to be dried at which temperature prior to introduction into the furnace shaft in order to set the desired water content. This preliminary drying or thermal preconditioning usually occurs in a tube furnace, but can also be performed in a fluid bed furnace. That is why an especially preferred embodiment of the method in accordance with the invention provides that the material is thermally preconditioned before entrance into the furnace shaft, preferably in a fluid bed furnace. It is understood that such thermal preconditioning occurs at a temperature which is clearly beneath the critical temperature in the furnace shaft.

The thermal aftertreatment requires that substantially all sand grains are already present in the expanded state. It needs to be ensured in this case that the expansion of the material occurs as far as possible in a defined or narrow vertical region of the furnace shaft. Consequently, the sand grains must be similarly large, so that all sand grains become plastic and expand substantially at the same time and according to the same energy input. That is why a preferred embodiment of the method in accordance with the invention provides that the material is screened prior to entering the furnace shaft in order to ensure a size distribution of the sand grains in the furnace shaft as homogeneous as possible.

As already mentioned above, the thermal treatment of the material after the expansion process has effects on the condition of the surface, especially the roughness of the expanded granulate. It is important according to the further use of the granulate (e.g. when processed into panels) to provide the surface of the expanded material with a rough configuration. As a result, the individual granulate grains can be glued to each other by means of a suitable binding agent such as water glass in order to enable the production of dimensionally stable panels with the required strength values. Such panels are suitable among other things for the interior dry finishing of residential rooms with high heat-insulating properties, thus achieving a reduction in energy consumption when using air-conditioning systems in the summer, for example.

The use of water glass as a binding agent also allows applying a layer of the granulate produced in accordance with the invention to conventional polystyrene panels, which layer is used for fire protection. It is understood that such fire-resistant layers or fire-protection layers can also be applied to a large number of other parts such as steel beams.

The surface of the expanded material can be influenced by solidifying or glazing the expanded grains in a cold air flow. For this purpose, cooling air is admixed directly after the expanding shaft to the present mixture of process air and expanded material so that cooling occurs to beneath 100° C., preferably to beneath 80° C. That is why it is provided in a preferred embodiment of the method in accordance with the invention that cooling air is admixed during the discharge of the material from the furnace or furnace shaft in order to cool the material to a temperature of beneath 100° C., preferably beneath 80° C. It is accordingly provided in a preferred embodiment of the apparatus in accordance with the invention that means for admixing cooling air during the discharge of the material from the furnace or furnace shaft are provided in the bottom region of the furnace or furnace shaft. These means preferably concern an outflow opening for the cooling air, which opening is directly arranged at the bottom end of the furnace shaft, and a cooling air valve which is especially arranged in a controllable fashion.

A water-cooled chute can optionally or additionally be used for the discharge of the material, wherein the water cooling contributes to further cooling of the material, as a result of which its plastic deformability is further reduced. It is accordingly provided in an especially preferred embodiment of the apparatus in accordance with the invention that a preferably water-cooled chute is provided in order to discharge the material from the furnace or furnace shaft.

The granulate cooled in this manner is transported in a further step by means of pneumatic entrained-flow conveyance and is further cooled, by means of which the condition of the surface or strength of the granulate is also influenced. That is why a further preferred embodiment of the method in accordance with the invention provides that the material is conveyed after discharging by means of pneumatic entrained-flow conveyance to a storage container, wherein a cool fluid, preferably cool air, is used, by means of which the material is cooled even further and preferably has room temperature in the storage container. The latter allows easy handling, e.g. bagging, of the produced granulate. It is similarly provided in an especially preferred embodiment of the apparatus in accordance with the invention that a pneumatic entrained-flow conveyance is provided for conveying the material discharged from the furnace or furnace shaft to a storage container.

BRIEF DESCRIPTION OF THE DRAWINGS

The invention is now explained in closer detail by reference to embodiments. The drawings show examples and explain the ideas of the invention, but shall in no way limit or represent the same in a final manner, wherein.

DETAILED DESCRIPTION OF THE PREFERRED EMBODIMENTS

Figure 1:
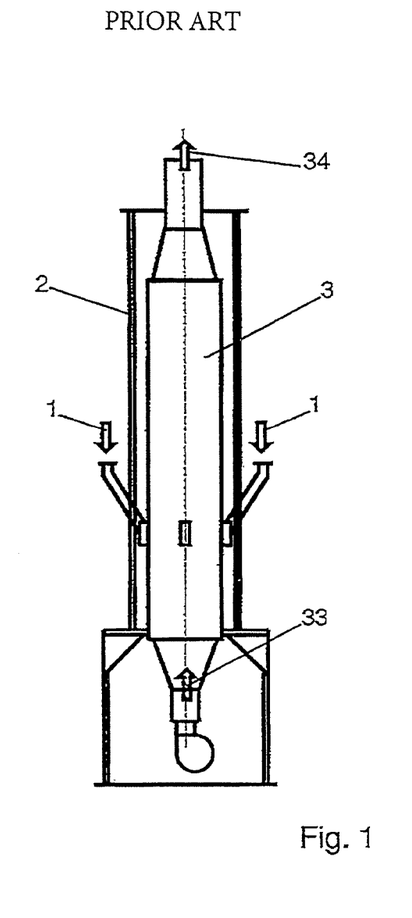
FIG. 1 shows a schematic sectional view of a shaft furnace for expanding pearlite sand according to the state of the art.

FIG. 1 shows a schematic sectional view of a furnace 2 known from the state of the art for foaming or expanding pearlite sand 1. The furnace 2 substantially consists of a vertically upright furnace shaft 3, in which hot gas 33 is injected from below. Pearlite sand 1 is introduced from above, in the embodiment as shown in FIG. 1 over approximately one-third of the total height of the furnace shaft 3. The sand grains 15 of the pearlite sand 1 (not shown in FIG. 1) are expanded as a result of the hot gas 33, which leads to a reduction in their density. This consequently produces the effect that the expanded sand grains 15 rise in the furnace shaft 3. The hot exhaust gas 34 with the expanded granulate is discharged at the upper end of the furnace shaft 3. The expanded granulate can be separated by a filter (not shown).

It is disadvantageous in this method that the sand grains 15 will usually break open during the expansion process and are therefore extremely hygroscopic.

Figure 2:
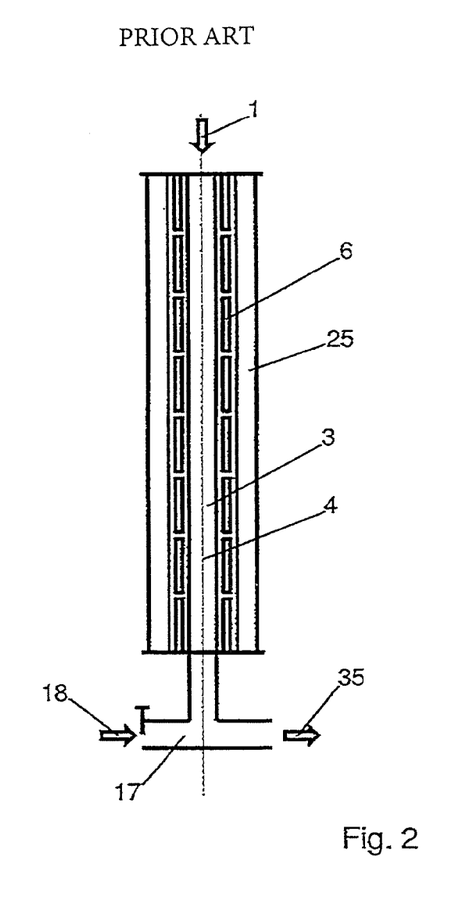
FIG. 2 shows a schematic sectional view of a further shaft furnace for expanding particles as known from the state of the art.

FIG. 2 shows a schematic sectional view of a furnace 2, as is known from WO 2009/009817 A1. This furnace 2 also comprises a vertically upright furnace shaft 3. In this case, the pearlite sand 1 is allowed to drop from above through the furnace shaft 3, i.e. the pearlite sand 1 falls along the drop section 4, which extends through the furnace shaft 3. Heating elements 6 are arranged along the drop section 4, which heating elements supply heat to the pearlite sand 1, thus leading to expansion. The furnace 2 or the heating elements 6 are insulated to the outside by means of heat insulation 25.

The expanded granulate is discharged from the furnace shaft 3 at the bottom end of the furnace 2 and falls into an entrained-flow conveyance 17. The expanded granulate is carried off in a substantially horizontally aligned tube by means of a strong flow of cool air 18, 35. Although closed-cell expanded granulates can be produced by the furnace as shown in FIG. 2 under certain circumstances, WO 2009/009817 A1 does not provide any details on the expansion process.

Figure 3:
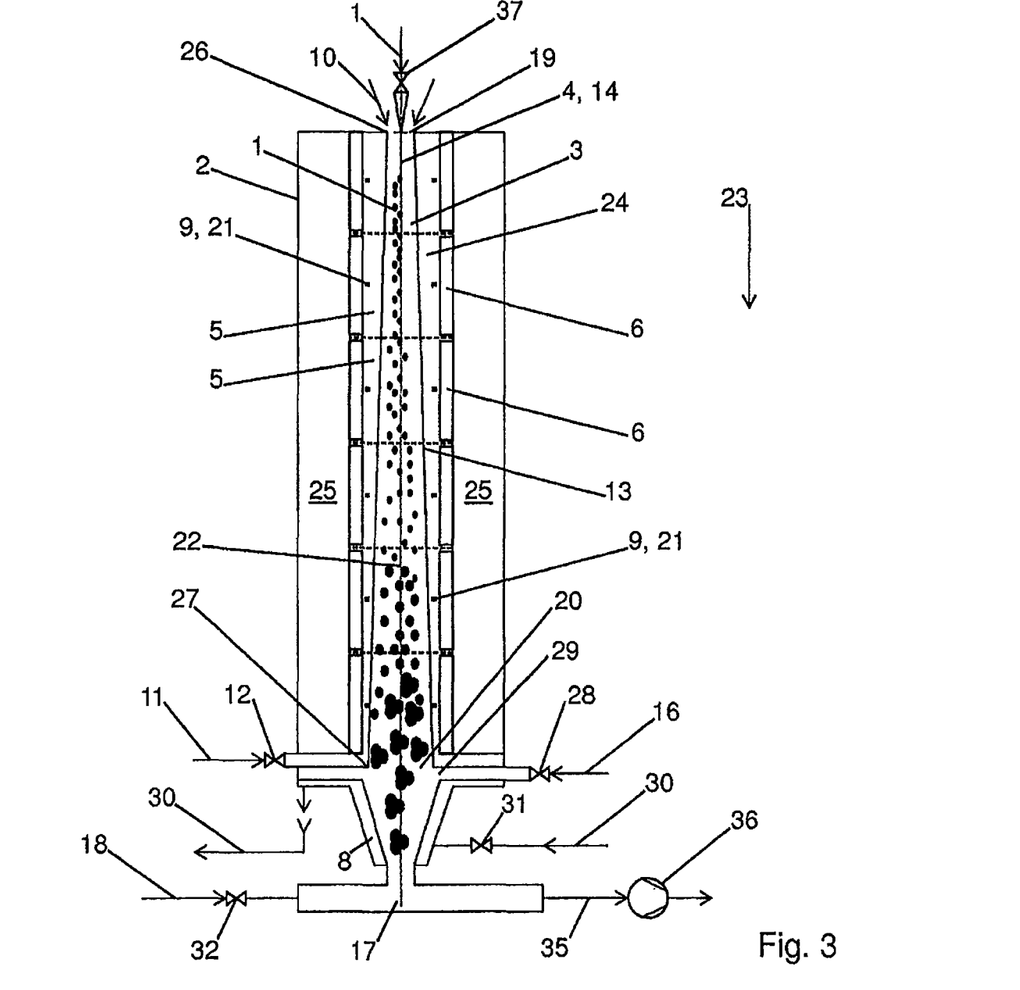
FIG. 3 shows a schematic sectional view of a shaft furnace in accordance with the invention for the closed-cell expansion in accordance with the invention, wherein the material disposed in the furnace is also schematically outlined.

FIG. 3 shows a furnace 2 in accordance with the invention, which is suitable for performing the method in accordance with the invention for the closed-cell expansion of a sand grain-shaped mineral material in which water or any other propellant is bound. The furnace 2 comprises a vertically extending furnace shaft 3, at the upper end 26 of which a feed opening 19 for the material to be expanded such as pearlite sand 1 is arranged.

Figure 6:
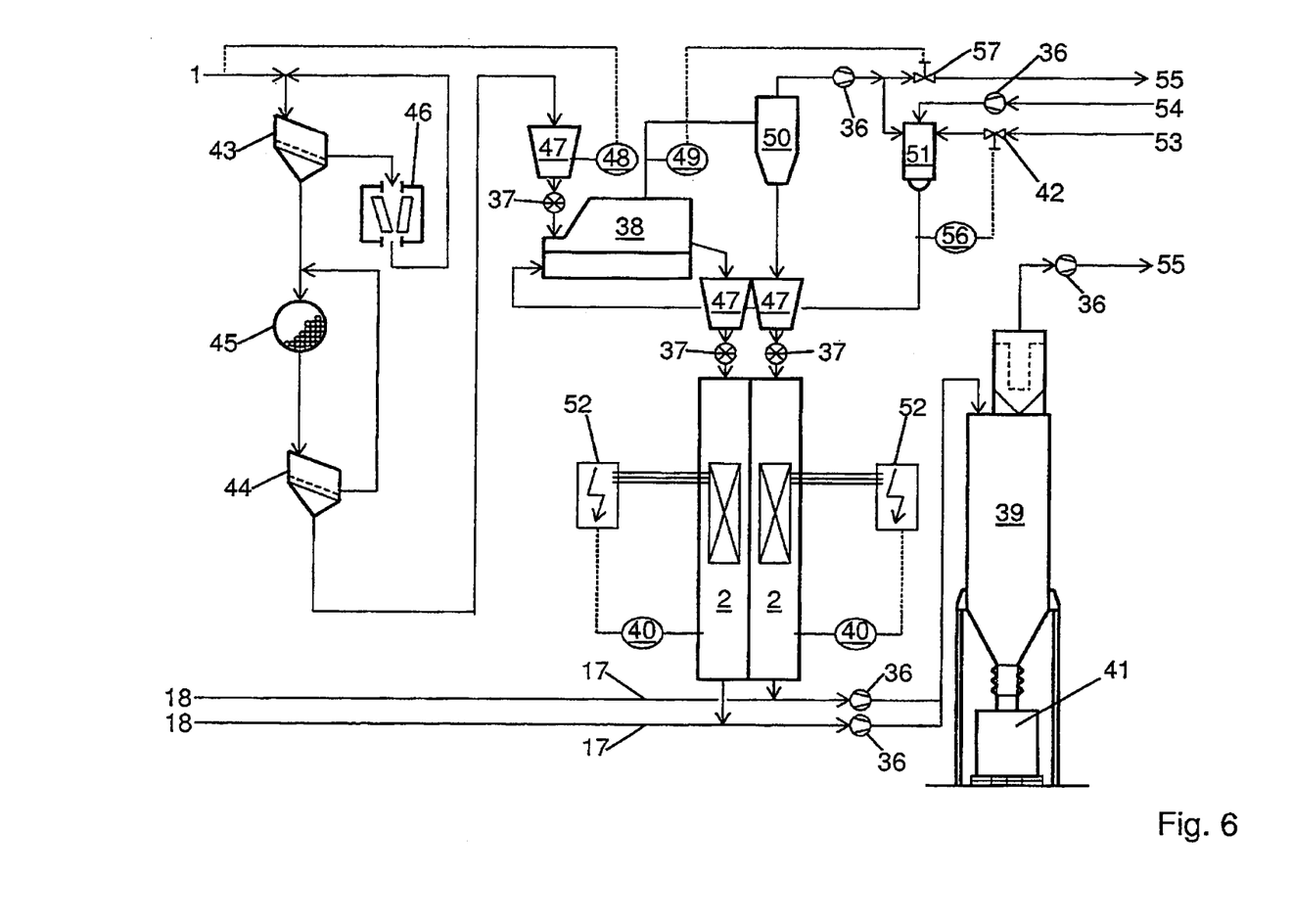
FIG. 6 shows a total flow diagram of a method in accordance with the invention.

In this process, the pearlite sand 1 can be preconditioned prior to the supply to the furnace 2 concerning the fraction of bound water or propellant, e.g. in a fluid bed furnace 38 (see FIG. 6). The feeding of the pearlite sand 1 to the furnace 2 or the furnace shaft 3 can occur via a chute (not shown), or the feeding of the pearlite sand 1 can be controlled via a valve 37.

The pearlite sand 1 falls from the feed opening 19 along a drop section 4 in a falling direction 23 perpendicularly through the furnace shaft 3 to a discharge opening 20 at the bottom end 27 of the furnace 2 or the furnace shaft 3.

The width of the furnace shaft 3 (i.e. the cross-section of the furnace shaft 3 normal to the falling direction 23) increases from the feed opening 19 to the discharge opening 20. In the illustrated embodiment, this widening occurs continually, so that the cross-section of the furnace shaft 3 has a conical shape parallel to the falling direction 23. The cross-section of the furnace shaft 3 normal to the falling direction 23 can have a rectangular or square shape, or a round or circular shape.

The furnace 2 is subdivided in the falling direction 23 into heating zones 5 (indicated in FIG. 3 by the dashed lines) with at least one respective heating element 6 in order to heat the pearlite sand 1 falling through the furnace shaft 3. In the illustrated embodiment, the heating elements 6 are arranged symmetrically with respect to a plane which extends through the radial center 14 of the furnace shaft 3. The heating elements 6 may concern both electrical heating elements 6 and also gas-operated heating elements 6. It is relevant that the heating elements 6 are arranged for supplying heat radiation, i.e. the transmission of heat to the pearlite sand 1 occurs primarily by means of heat radiation and not by convection for example.

As seen in the direction of the radial center 14 of the furnace 2, a heat-resistant fabric 24 is arranged after the heating elements 6. The furnace shaft 3 therefore comprises an inner surface 13 which is lined with a heat-resistant fabric 24, or the heat-resistant fabric 24 forms the inner surface 13 of the furnace shaft 3. The heat-resistant fabric 24 offers the advantage of lower heat storage masses or capacities in contrast to heat-resistant steels which are usually used according to the state of the art, so that rapid start-up and shutdown times of the furnace 2 can be realized.

The heat-resistant fabric 24 is also permeable to air. As a result, a second process air 11 can be injected through the fabric 24 in the direction of the radial center 14 of the furnace shaft 3 in order to counteract the adhesion by caking of the heated sand grains 15 on to the inner surface 13 of the furnace shaft 3. The second process air 11 is guided into the intermediate space disposed between the furnace shaft 3 or its inner surface 13 and outer heat insulation 25 of the furnace 2, in which the heating elements 6 are also arranged.

The quantity of second process air 11 is controlled via a valve 12 which is preferably controllable.

Temperature sensors 21 are also arranged in the fabric 24. The temperature sensors 21 are arranged at positions 9 which are spaced from each other vertically, so that at least one temperature sensor 21 is situated in each heating zone 5. In the illustrated embodiment, the temperature of the pearlite sand 1 is determined over the temperature prevailing in the heating zone 5.

The heating elements 6 and the temperature sensors 21 are connected to an open-loop and closed-loop control unit 40 (see FIG. 6) which determines the position or the region 22 in the furnace shaft 15 at which or in which the expansion of the sand grains 15 occurs on the basis of the temperature data. At this position or in this region 22 there is a distinct reduction in the temperature, i.e. a temperature drop of over 100° C. of the expanded pearlite sand 1 for example. This drop in temperature is the consequence of an isenthalpic expansion process of the pearlite sand 1, wherein the expansion process is produced by a softening of the surface 7 of the sand grains 15, followed by an expansion process as a result of the water vapor or water vapor pressure formed in the sand grains 15. The pearlite sand 1 has a temperature of approximately 780° C. directly before its expansion for example and a temperature of only approximately 590° C. directly after the isenthalpic expansion process, i.e. a temperature drop of 190° C. occurs in this example. The open-loop and closed-loop control unit controls the heating elements 6 which are situated after the position or region 22 of the temperature drop as seen in the falling direction 23, so that no further or subsequent increase occurs in the temperature of the (expanded) pearlite sand 1 any more. In the simplest of cases, the power of these heating elements 6 is set to zero.

Figure 4:
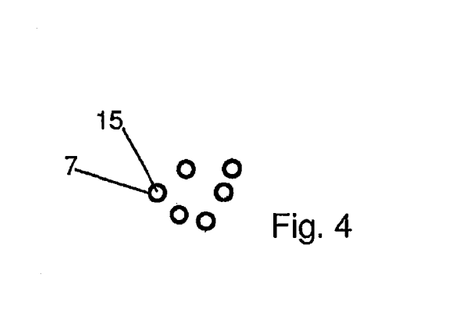
FIG. 4 shows a schematic view of a closed-cell, expanded granulate with spherical surface structure as shown from above.
Figure 5:
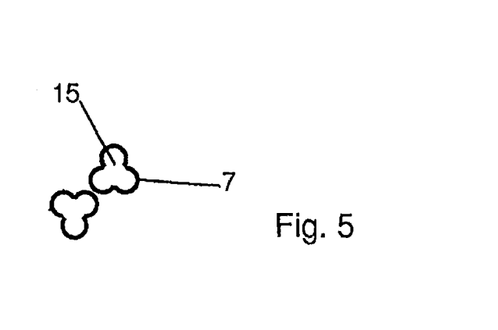
FIG. 5 shows a schematic view of a closed-cell, expanded granulate with rough surface structure as shown from above.

The thermal treatment of the sand grains 15 after the expansion process influences their surface structure. The surface shall be glazed within the terms of high strength by cooling on the one hand. Different levels of roughness of the expanded granulate can be achieved on the other hand, in that several small sand grains join into a larger one. FIG. 4 shows the case where the discharged expanded material substantially consists of individual sand grains 15 with a spherical surface 7. FIG. 5 shows in contrast an expanded granulate with larger sand grains 15 which have a rough surface 7

In order to enable rapid cooling of the expanded pearlite sand 1, a cooling air 16 is injected during the discharge from the furnace 2 (see FIG. 3). An outflow opening 29 for the cooling air 16 is provided for this purpose in the region of the discharge opening 20. The quantity of cooling air 16 can be regulated by a preferably controllable valve 28. The cooling air produces a cooling of the expanded pearlite sand 1 to a temperature of beneath 100° C., preferably beneath 80° C.

A chute 8 is arranged as seen in the falling direction 23 after the discharge opening 20, directly adjacent to the outflow opening 29 for the cooling air 16. Said chute is cooled by means of cooling water 30, the quantity of which is controlled by a preferably controllable valve 31. The expanded pearlite sand 1 is further cooled in this manner.

The expanded pearlite sand 1 finally reaches an entrained-flow conveyance 17 via the chute 8, with which the pearlite sand 1 is conveyed to a storage container 39 (FIG. 6). The entrained-flow conveyance 17 operates with cool air 18, the quantity of which is controlled by means of a preferably controllable valve 32. The cool air 18 or the cool air with the expanded pearlite sand 35 is sucked in by a vacuum pump 36 for example.

The cool air 18 or the cool air with the expanded pearlite sand 35 which moves rapidly in the entrained-flow conveyance 17 produces a negative pressure in relation to the furnace shaft 3. This negative pressure ensures that the pearlite sand 1 is sucked in together with the process air 10 from the feed opening 19 through the furnace shaft 3. This again leads to the consequence that the expanded sand grains 15 of the pearlite sand 1 are moved jointly with the first process air 10 through the furnace shaft 3 at a velocity which is as constant as possible and preferably at the same speed.

Furthermore, the definition of the position or the region 22 can be improved even further in that a size (and therefore a mass) of the sand grains 15 which is as uniform as possible is ensured by screening (not shown) of the sand grains 15 prior to the entrance into the furnace 2, so that all sand grains 15 will expand as far as possible with the same duration of the thermal treatment in the furnace shaft 3.

FIG. 6 shows the entire flow diagram of a method in accordance with the invention, in which a furnace 2 in accordance with the invention is used for the expansion. The pearlite sand 1 is supplied at first in this process from a material supply to a coarse screen 43, which screens out grains which are much too big and which have a larger diameter of more than 30 mm for example. These excessively large sand grains 15 are supplied to a jaw crusher 46, whereupon the sand grains 15 crushed by the jaw crusher 46 reach the coarse screen 43 again.

Once the pearlite sand 1 has passed the coarse screen 43, it reaches a rod mill which produces a uniformly small diameter of the sand grains 15 of the pearlite sand 1, e.g. a diameter of 0.5 mm. This small diameter is checked by a fine screen 44 situated after the rod mill 45. Grains that are too large are supplied to the rod mill 45 again.

The pearlite sand 1 reaches a silo 47 after the fine screen 44. A filling-level control unit 48 monitors the filling level in said silo 47 and activates the supply of further pearlite sand 1 to the material supply in the case of an insufficient filling level. The pearlite sand 1 is supplied from the silo 47 to a fluid bed furnace 38 via a valve 37. Thermal preconditioning of the pearlite sand 1 occurs in the fluid bed furnace 38 in order to set the water content or the content of bound propellant.

The heating in the fluid bed furnace 38 occurs for example by means of natural gas 53 which is combusted in a burner 51 together with combustion air 54. The combustion air 54 is supplied to the burner by means of a vacuum pump 36 for example. The quantity of natural gas 53 supplied to the burner 51 is controlled via a valve 42 which is triggered by a temperature control unit 56 which controls the temperature of the burner 51.

The exhaust air 55 from the fluid bed furnace 38 is discharged via a cyclone 50, wherein the exhaust air is supplied to the burner 51 again, e.g. via a further vacuum pump 36, or can escape through a valve 57. The valve 57 is triggered by a pressure control unit 49 which controls the pressure in the fluid bed furnace 38. The pearlite sand 1 reaches a further silo 47 from the fluid bed furnace 38 from where it can be supplied to the furnace 2 via a valve 37.

FIG. 6 shows a further furnace 2 which is also supplied with pearlite sand 1. It concerns pearlite sand 1 which was separated from the exhaust air 55 in the cyclone 50 and was conveyed to a further silo 47.

In the embodiment shown in FIG. 6, each furnace 2 is heated electrically, wherein the heating elements 6 (see FIG. 3) are supplied with power by means of electric power supplies 52. The power supply 52 is connected to the open-loop and closed-loop control unit 40. It is not only possible to control the power of the heating elements 6 in this manner, but the position or the region 22 of the temperature drop (see FIG. 3) can be determined by the determination of the power consumption of successive heating elements 6.

The expanded pearlite sand 1 is conveyed to a storage container 39 after the discharge from the furnace 2 via an entrained-flow conveyance 17 which operates with cool air 18, which on its part is sucked in by a vacuum pump 36. Exhaust air 55 can be discharged by means of a further vacuum pump 36 from the storage container 39.

The storage container 39 is arranged in the illustrated embodiment above a bagging apparatus 41, by means of which the expanded pearlite sand can be bagged or packed in bags, e.g. so-called big bags or other preferably flexible bulk containers.

LIST OF REFERENCE NUMERALS

1 Pearlite sand
2 Furnace
3 Furnace shaft
4 Drop section
5 Heating zone
6 Heating element
7 Surface of a sand grain
8 Chute
9 Position for temperature measurement
10 First process air
11 Second process air
12 Valve for second process air
13 Inner surface of furnace shaft
14 Radial center of furnace shaft
15 Sand grain
16 Cooling air
17 Entrained-flow conveyance
18 Cooling air for entrained-flow conveyance
19 Feed opening
20 Discharge opening
21 Temperature sensor
22 Position or region of temperature drop
23 Falling direction
24 Heat-resistant fabric
25 Thermal insulation
26 Upper end of furnace or furnace shaft
27 Bottom end of furnace or furnace shaft
28 Valve for cooling air
29 Outflow opening for the cooling air
30 Cooling water
31 Valve for cooling water
32 Valve for cooling air of entrained-flow conveyance
33 Hot gas
34 Hot exhaust gas with expanded pearlite sand
35 Cool air with expanded pearlite sand
36 Vacuum pump
37 Valve for pearlite sand
38 Fluid bed furnace
39 Storage container
40 Open-loop and closed-loop control unit
41 Bagging station
42 Valve for natural gas
43 Coarse screen
44 Fine screen
45 Rod mill 46 Jaw crusher
47 Silo
48 Filling-level control
49 Pressure control
50 Cyclone
51 Burner
52 Electric power supply
53 Natural gas
54 Combustion air
55 Exhaust air
56 Temperature control
57 Valve for exhaust air

The invention claimed is:

1. A method for producing an expanded granulate from a sand grain-shaped mineral material comprising a propellant, the method comprising:
feeding the sand grain-shaped mineral material-into a vertically upright furnace from above such that said sand grain-shaped mineral material falls along a drop section through multiple heating zones separated vertically from each other in a furnace shaft of the vertically upright furnace, wherein each of the multiple heating zones is outfitted with at least one independently controllable heating element;
heating the sand grain-shaped mineral material to a critical temperature at which surfaces of sand grains plasticize and the sand grains are expanded by the propellant in an isenthalpic manner, thereby forming an expanded sand grain-shaped mineral material; and
discharging the expanded sand grain-shaped mineral material at a bottom end of the vertically upright furnace, wherein upon detection of a first reduction in a temperature of the sand grain-shaped mineral material between two successive positions along the drop section, the at least one independently controllable heating element is controlled in the drop section after the two successive positions depending on the critical temperature.

2. The method according to claim 1,
wherein the at least one independently controllable heating element is controlled in the drop section after the two successive positions in such a way that a material temperature does not increase to or over the critical temperature in the drop section after the two successive positions.

3. The method according to claim 1,
wherein the at least one independently controllable heating element is controlled in the drop section after the two successive positions in such a way that a material temperature increases to or over the critical temperature in the drop section after the two successive positions.

4. The method according to claim 1,
wherein a power of the at least one independently controllable heating element is set to zero in the drop section after the two successive positions.

5. The method according to claim 1,
wherein the sand grain-shaped mineral material with the propellant is a mineral material in which water is bound and acts as the propellant, a mineral dust mixed with water-containing mineral binding agent which acts as the propellant, or a mineral dust mixed with the propellant which is mixed with mineral binding agent.

6. The method according to claim 1,
wherein the temperature of the sand grain-shaped mineral material in the furnace shaft is measured directly or indirectly at several positions which are vertically spaced from each other in order to detect a first reduction in the temperature of the sand grain-shaped mineral material between two successive positions along the drop section.

7. The method according to claim 6,
wherein the first reduction in the temperature of the material between two successive positions (9) along the drop section (4) is at least 100° C.

8. The method according to claim 1,
wherein a change in a heat flow from the at least one independently controllable heating element to the sand grain-shaped mineral material is determined,
wherein the change between one heating zone and a next zone, is determined, and the detection of the first reduction in the temperature of the sand grain-shaped mineral material between two successive positions along the drop section occurs by detecting an increase in the heat flow from one heating zone to the next zone.

9. The method according to claim 8,
wherein the change between two successive heating zones is determined and the first reduction in the temperature of the sand grain-shaped mineral material between two successive positions along the drop section occurs by detecting an increase in the heat flow between the two successive heating zones.

10. The method according to claim 1,
wherein the sand grain-shaped mineral material is sucked through the furnace shaft together with first process air by maintaining a negative pressure in the furnace shaft.

11. The method according to claim 10,
wherein the first process air flows at a substantially constant velocity through the furnace shaft.

12. The method according to claim 11,
wherein the expanded sand grain-shaped mineral material falls at a substantially constant velocity through the furnace shaft based on the expanded sand grain-shaped mineral material's diameter.

13. The method according to claim 1,
wherein a quantity of second process air which is regulated with at least one throttling member is blown from an inner surface of the furnace shaft in a direction towards a radial center of the furnace shaft in order to prevent adhesion by caking the sand grain-shaped mineral material on the inner surface of the furnace shaft.

14. The method according to claim 1,
wherein the sand grain-shaped mineral material is thermally preconditioned before entering into the furnace shaft.

15. The method according to claim 1,
wherein the sand grain-shaped mineral material is screened prior to entering the furnace shaft in order to ensure a size distribution of the sand grains in the furnace shaft as homogeneous as possible.

16. The method according to claim 1,
wherein cooling air is admixed during the discharging of the sand grain-shaped mineral material from the vertically upright furnace or furnace shaft in order to cool the sand grain-shaped mineral material to beneath 100° C.

17. The method according to claim 1,
wherein the sand grain-shaped mineral material is conveyed after discharging with a pneumatic entrained-flow conveyance to a storage container and
a cool fluid with which the sand grain-shaped mineral material is cooled in the storage container.

18. The method according to claim 1, the expanded sand grain-shaped mineral material is an expanded granulate from pearlite sand or obsidian sand.

19. An apparatus for producing an expanded granulate, the apparatus comprising:
a vertically upright furnace plus furnace shaft, comprising a feed opening at an upper end of the furnace shaft for feeding a sand grain-shaped material and a discharge opening at a bottom end of the furnace shaft, and
a drop section situated between the feed opening and the discharge opening in the furnace shaft, in which the drop section leads through several heating zones which are vertically separated from each other, wherein the several heating zones each comprise one or more heating elements which are controllable independently from each other in order to heat the sand grain-shaped mineral material to a critical temperature at which the sand grain-shaped material is expanded by a propellant in an isenthalpic manner, and comprising at least one of
several temperature sensors for direct or indirect measurement of the temperature of the material and
means for determining a power of the one or more heating elements of the several heating zones,
wherein a control unit is connected to at least one of the several temperature sensors and
the means for determining a power of the one or more heating elements of the several heating zones and to the one or more heating elements of the several heating zones in order to detect a first decrease in the temperature of the sand grain-shaped mineral material, between two successive positions along the drop section, and
the one or more heating elements are controllable depending on the critical temperature by the control unit.

20. The apparatus according to claim 19, wherein at least one temperature sensor is arranged in each of the several heating zone.

21. The apparatus according to claim 19, wherein a cross-section of the furnace shaft increases normally to the drop section from the feed opening to the discharge opening.

22. The apparatus according to claim 19, wherein a cross-section of the furnace shaft parallel to the drop section has a conical shape.

23. The apparatus according to claim 19, wherein means are provided for producing a negative pressure in the furnace shaft along the drop section in a falling direction which is parallel to the drop section and positioned towards the falling direction to suck first process air at a substantially constant velocity through the furnace shaft.

24. The apparatus according to claim 19, wherein the furnace shaft comprises an inner surface which is lined with a heat-resistant fabric or glass segment.

25. The apparatus according to claim 24, wherein the heat-resistant fabric is air-permeable and second process air can be injected through an air-permeable, heat-resistant fabric in a direction towards a radial center of the furnace shaft.

26. The apparatus according to claim 25, wherein at least one throttling member is provided, with which a quantity of the second process air to be injected is adjustable.

27. The apparatus according to claim 24, wherein gaps are arranged between glass segments and
second process air can be injected through the gaps in a direction towards a radial center of the furnace shaft in order to prevent adhesion by caking the sand grain-shaped mineral material on to the inner surface of the furnace shaft.

28. The apparatus according to claim 24, wherein the one or more heating elements are arranged behind a lining of the inner surface of the furnace shaft as seen in a direction radially to an outside, and
a thermal insulation is arranged behind the one or more heating elements.

29. The apparatus according to claim 19, wherein means for admixing cooling air during a discharge of the sand grain-shaped mineral material from the vertically upright furnace or furnace shaft are provided in the bottom end of the vertically upright furnace or furnace shaft.

30. The apparatus according to claim 19, wherein a water-cooled chute is provided in order to discharge the sand grain-shaped mineral material from the vertically upright furnace or furnace shaft.

31. The apparatus according to claim 19, wherein a pneumatic entrained-flow conveyance is provided for conveying the sand grain-shaped mineral material discharged from the vertically upright furnace or furnace shaft to a storage container.

32. The apparatus according to claim 19, wherein the first decrease in the temperature of the sand grain-shaped mineral material between two successive positions along the drop section is of at least 100° C.

33. The apparatus according to claim 19, wherein the one or more heating elements are controllable depending on the critical temperature by the control unit in order to prevent or to enable in a purposeful fashion an increase in the temperature of the sand grain-shaped mineral material along the drop section after the two successive positions to the critical temperature or over the critical temperature.

* * * * *